Figure 8:
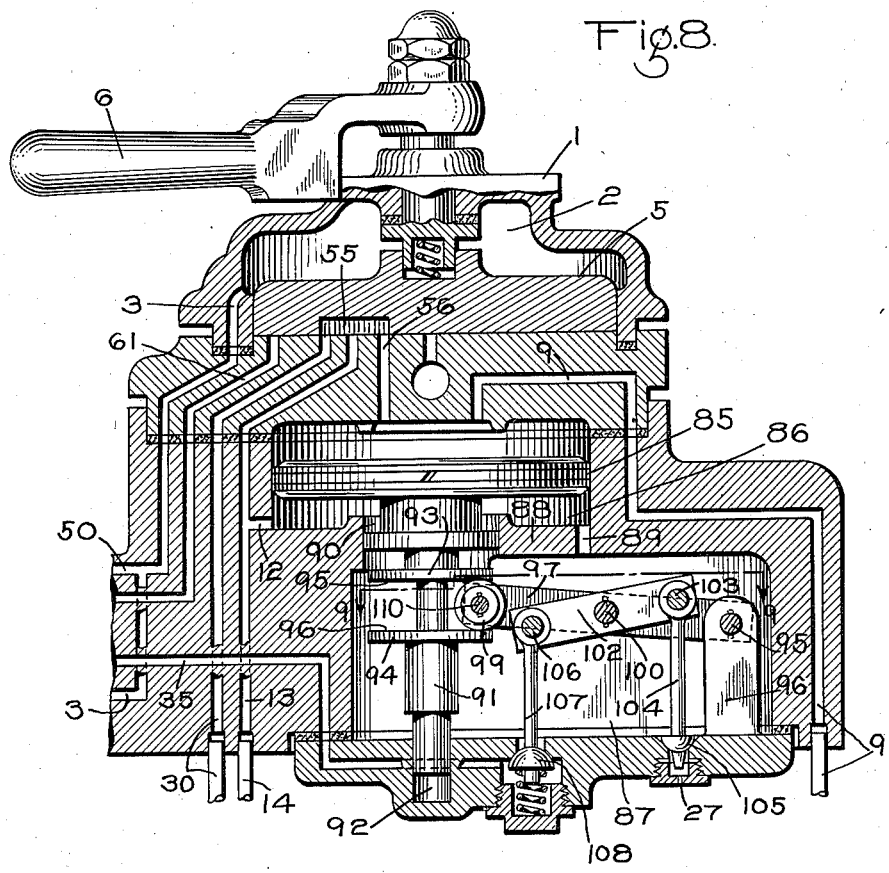

Sept. 22, 1936.  E. E. HEWITT  2,055,105
MAINTAINING VALVE DEVICE
Filed Jan. 11, 1934  3 Sheets-Sheet 1
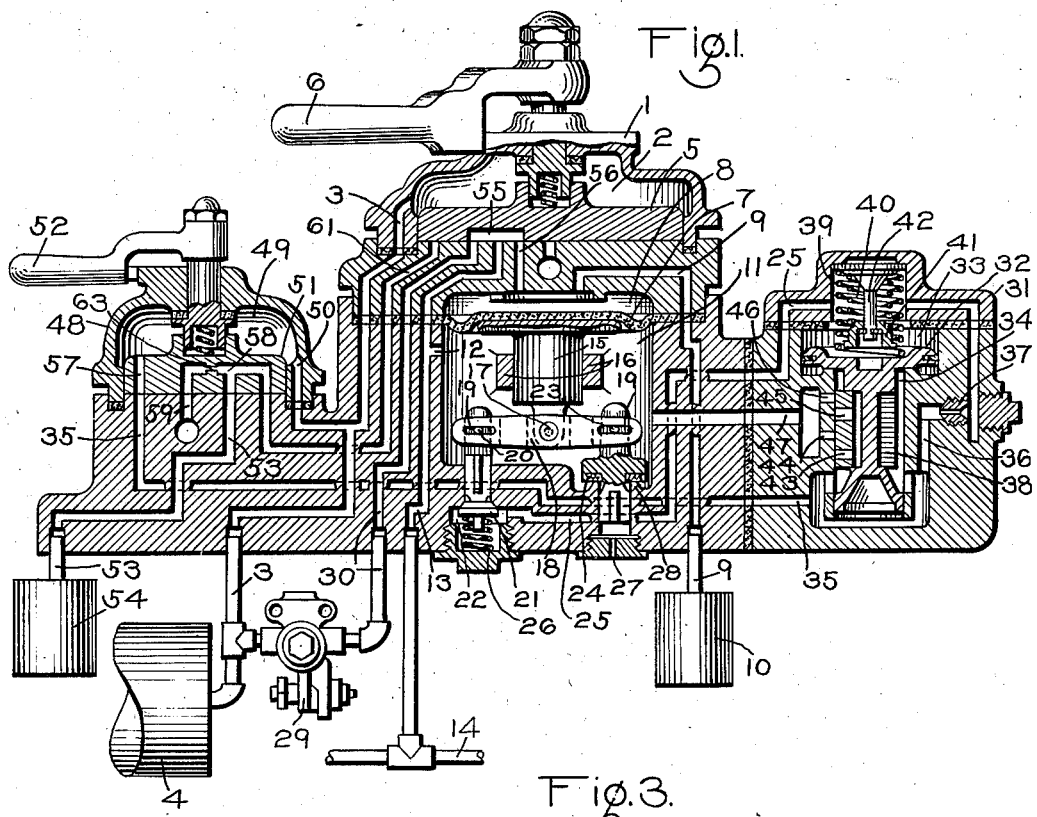
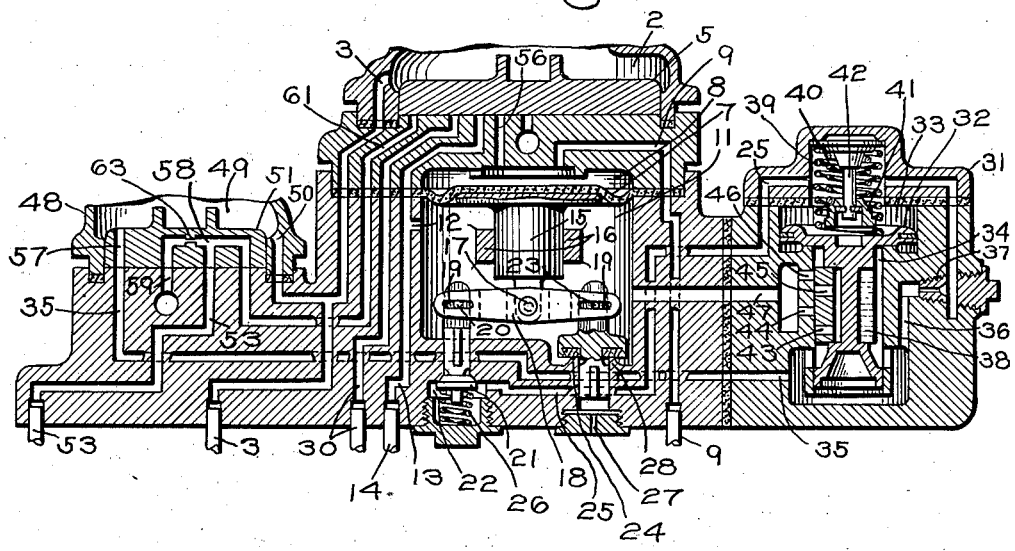
INVENTOR
ELLIS E. HEWITT
BY
Wm. M. Cady
ATTORNEY Sept. 22, 1936.  E. E. HEWITT  2,055,105
MAINTAINING VALVE DEVICE
Filed Jan. 11, 1934.  3 Sheets-Sheet 2
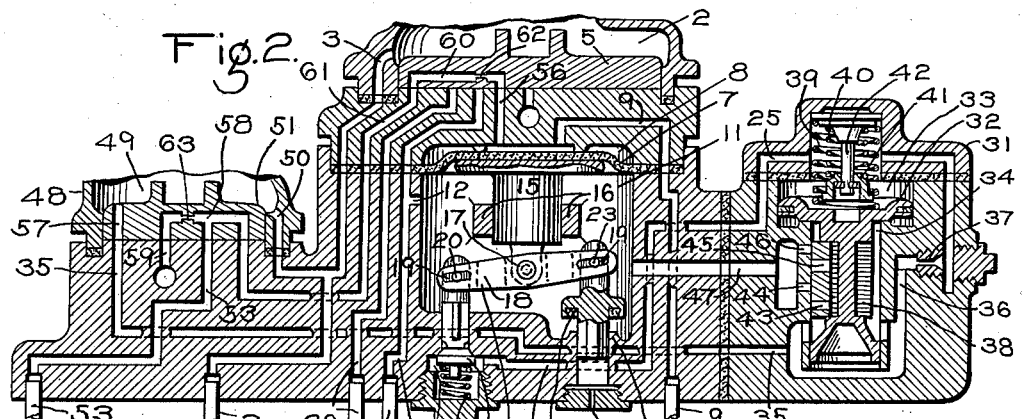
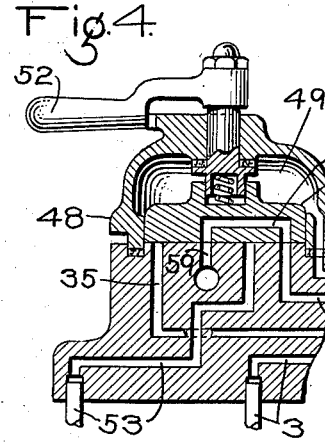
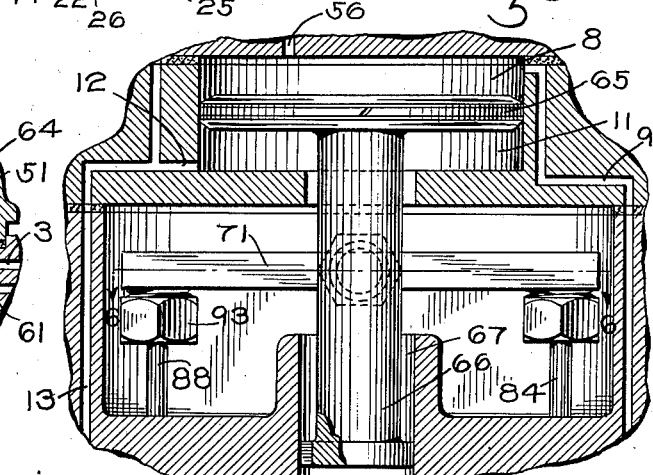
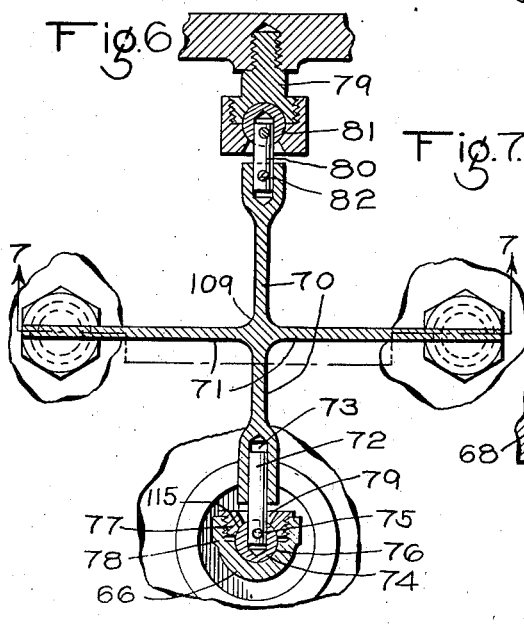
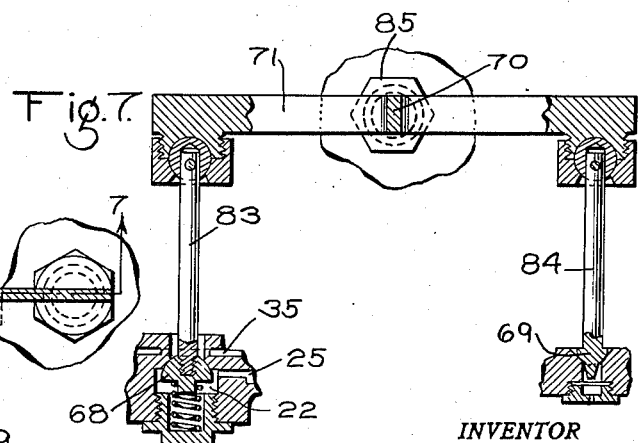
INVENTOR
ELLIS E. HEWITT
BY Wm. M. Cady
ATTORNEY Sept. 22, 1936.  E. E. HEWITT  2,055,105
MAINTAINING VALVE DEVICE
Filed Jan. 11, 1934   3 Sheets-Sheet 3

INVENTOR
ELLIS E. HEWITT
BY *Wm. M. Cady*
ATTORNEY

Patented Sept. 22, 1936

2,055,105

UNITED STATES PATENT OFFICE 2,055,105

MAINTAINING VALVE DEVICE

Ellis E. Hewitt, Edgewood, Pa., assignor to The Westinghouse Air Brake Company, Wilmerding, Pa., a corporation of Pennsylvania Application January 11, 1934, Serial No. 706,227

26 Claims. (Cl. 303—60)

This invention relates to fluid pressure brakes, and more particularly to the type operated according to variations in pressure in a brake pipe.

In effecting a service application of the brakes on a long train, particularly on a long freight train, equipped with the conventional fluid pressure brake equipment, it is desirable to make an initial light reduction in brake pipe pressure, say a five or seven pound reduction, in order to apply the brakes serially with only a light force so as to cause a gentle run-in of train slack, and after the train slack has gathered to further reduce brake pipe pressure to obtain the desired braking force to control the train.

One object of the invention is to provide an automatic brake valve device having the usual service position and having associated therewith means, under the control of the operator, adapted to automatically modify the reduction in brake pipe pressure through the brake valve device, when said device is in the usual service position, so as to effect an initial predetermined limited reduction in brake pipe pressure followed by a further reduction at a rate slower than the usual service rate.

If there is leakage from the brake pipe when the above mentioned brake valve device is conditioned to effect the initial or slack gathering portion of the reduction in brake pipe pressure, such leakage would increase the rate and the amount of reduction and thereby cause too heavy an application of the brakes at the head end of the train, with consequent harsh run-in of train slack.

Another object of the invention is to provide means operative, when the brake valve device is conditioned to effect the initial or slack gathering portion of the reduction in brake pipe pressure, to automatically supply fluid under pressure to the brake pipe at a rate equal to the rate of leakage from the brake pipe, thereby preventing such leakage from increasing either the rate or the degree of the reduction in brake pipe pressure so long as the brake valve device is conditioned as above mentioned.

Another object of the invention is to provide a valve device controlled by the opposing pressures of the brake pipe and equalizing reservoir and operative automatically upon a reduction in equalizing reservoir pressure to effect a corresponding reduction in brake pipe pressure and, in case of leakage from the brake pipe, to automatically maintain brake pipe pressure at substantially the pressure in the equalizing reservoir.

Other objects and advantages of the invention will appear in the following more detailed description.

Figure 9:
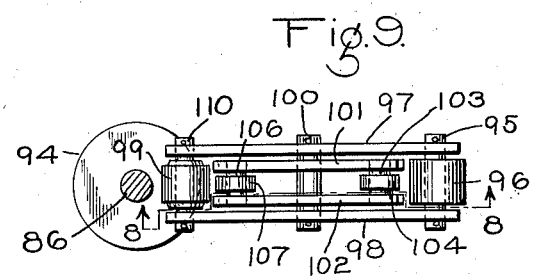

In the accompanying drawings; Fig. 1 is a diagrammatic view, partly in section, of a portion of a locomotive equipment including an automatic brake valve device and associated application control valve device and maintaining valve device embodying my invention, the brake valve device being shown in running position and the control valve device being shown in the position for conditioning the brake valve device to effect the slack gathering portion of the reduction in brake pipe pressure; Fig. 2 is a fragmental diagrammatic sectional view showing the brake valve device in the usual service position and the control valve device in the slack gathering and maintaining service position; Fig. 3 is a fragmental diagrammatic sectional view showing the brake valve device in lap position and the control valve device in the slack gathering and maintaining service position; Fig. 4 is a fragmental diagrammatic sectional view showing the control valve device in the position for conditioning the brake valve device to effect the usual service application; Fig. 5 is an elevational view of a modified form of the lever arrangement and the control abutment, which abutment is shown in the form of a piston; Fig. 6 is a sectional view taken on the line 6—6 of Fig. 5; Fig. 7 is a section taken on the line 7—7 of Fig. 6; Fig. 8 is an elevational view of another modified form of the lever arrangement; and Fig. 9 is a sectional view taken on the line 9—9 of Fig. 8.

As shown in Fig. 1 of the drawings, the automatic brake valve device 1 comprises a casing having a rotary valve chamber 2 connected through passage and pipe 3 to the usual main reservoir 4 and containing a rotary valve 5 adapted to be operated by a handle 6.

Mounted in the brake valve casing is a valve mechanism having a two-fold function, one function of which is to control the reduction in brake pipe pressure according to the reduction in equalizing reservoir pressure, in a manner similar to the usual equalizing discharge valve mechanism, and the other function of which is to control the operation of the maintaining valve device, which will be described hereinafter, so as to automatically maintain brake pipe pressure, during the slack gathering portion of the reduction in brake pipe pressure, at substantially the pressure in the equalizing reservoir, as will be understood from the description hereinafter. In the embodiment of the invention shown in Fig. 1, said mechanism comprises a flexible diaphragm 7 having the chamber 8 at one side connected through passage and pipe 9 with the usual equalizing reservoir 10 and having the chamber 11 at the opposite side connected through passages 12 and 13 with the usual brake pipe 14.

Contained in chamber 11 and secured to the diaphragm 7 is a flanged stem 15, the brake valve casing being provided with a lug 16 extending into chamber 11, said lug having an opening through which the stem 15 slidably extends. Pivotally mounted on a pin 17 carried at the lower end of the stem 15 is a lever 18, preferably extending transversely of the axis of said stem. Each end of said lever is provided with a slotted opening 19. Within one slot 19 is received a pin 20 carried by a pilot valve 21 contained in a chamber 22 provided in the casing, and within the other slot 19 is received a pin 23 carried by a discharge valve 24, contained in the casing chamber 11. The pilot valve 21 controls communication from chamber 22, which is connected by a passage 25 with the maintaining valve device, to be described hereinafter, to the chamber 11. Said pilot valve is normally held seated by a spring 26 and is adapted to be unseated by the downward movement of the diaphragm 7. The discharge valve 24 controls communication from chamber 11, and thereby from the brake pipe, to the restricted discharge passage 27 and is adapted to seat on a seat rib 28 surrounding said discharge passage, being adapted to be pulled away from said seat rib by the upward movement of the diaphragm 7.

The usual feed valve device 29 supplies fluid at a reduced pressure from the main reservoir 4 to a pipe and passage 30 leading to the seat of the rotary valve 5.

The maintaining valve device 31 comprises a piston 32 having at one side a chamber 33 connected by passage 25 with the pilot valve chamber 22 and having at the opposite side a chamber 34 connected by a passage 35 with the rotary valve seat of the control valve device, which will be described hereinafter, and also connected with the piston chamber 33 through a passage 36 containing a choke 37. The chamber 34 contains a slide valve 38 adapted to be operated by the piston 32, the outward movement of which is opposed by the coil springs 39 and 40. The spring 39 engages the piston 32 and the spring 40, which is disposed within the spring 39, engages a member 41 which is slidably mounted on a stem 42 carried by the maintaining valve casing.

The slide valve 38 is provided with two ports 43 and 45 adapted to register respectively with ports 44 and 46 which communicate with passage 47 leading to chamber 11, said ports 43 and 45 being so disposed that port 45 will commence to register with port 46 before port 43 registers with port 44. The member 41 is so positioned that the same will be engaged by the piston 32 when the piston has moved the slide valve 38 to the position in which the port 45 partly registers with port 46 and in which the port 43 has not yet been brought into registration with port 44.

The application control valve device 48 comprises a casing having a rotary valve chamber 49 connected through passage 50 and passage and pipe 3 to the main reservoir 4 and containing a rotary valve 51 adapted to be operated by a handle 52. The rotary valve 51 controls a passage 53 leading to a reduction limiting reservoir 54, a passage 35 leading to the valve chamber 34 in the maintaining valve device 31, and a passage 61 leading to the seat of the rotary valve 5 in the brake valve device 1.

In operation, fluid under pressure is supplied to the main reservoir 4 in the usual manner and flows from said reservoir into pipe and passage 3 and thence to the rotary valve chamber 2 in the brake valve device 1, and also from passage 3 through passage 50 to the rotary valve chamber 49 in the application control valve device 48.

Assuming that the control valve handle 52, and consequently the rotary valve 51, is in the normal, or slack gathering, position, shown in Fig. 1, fluid supplied to the rotary valve chamber 49 flows through a port 57 in the rotary valve 51 into passage 35 and thence to the valve chamber 34 in the maintaining valve device 31. From chamber 34 fluid under pressure flows through passage 36 and choke 37 to the piston chamber 33. Fluid thus supplied to piston chamber 33 is free to flow through passage 25 to the pilot valve chamber 22.

Fluid supplied to pipe 3 also flows to the feed valve device 29 which operates to supply fluid at reduced pressure to pipe and passage 30. With the brake valve handle 6, and consequently the rotary valve 5, in running position, as shown in Fig. 1, fluid at feed valve pressure flows through a cavity 55 in said rotary valve to passage 13 and thence to the brake pipe 14, and from passage 13 through passage 12 to chamber 11. Fluid supplied to passage 30 also flows through cavity 55 to passage 56 leading to the diaphragm chamber 8 and from thence through passage and pipe 9 to the equalizing reservoir 10.

If the length of the train, and consequently the brake pipe volume, is such that the pressure in chamber 11 builds up at substantially the same rate as that in chamber 8, the diaphragm 7 will remain in the position shown in Fig. 1 in which both the discharge valve 24 and the pilot valve 21 remain seated. If the length of the train is such that the pressure in chamber 8 builds up at a faster rate than the pressure in chamber 11, the diaphragm 7 will be deflected downwardly. This movement of the diaphragm operates, with the pin 23 acting as a fulcrum, to rotate the lever 18 in a counter-clockwise direction, causing the pilot valve 21 to be unseated against the light pressure of the spring 26. The unseating of valve 21 opens communication from chamber 22 to chamber 11 and this permits fluid under pressure to be vented from piston chamber 33 in the maintaining valve device 31 to chamber 11 through passage 25, valve chamber 22, and past the valve 21 at a faster rate than fluid at main reservoir pressure can be supplied to said piston chamber from valve chamber 34 through passage 36 and choke 37. The valve chamber 34 being subject to fluid at main reservoir pressure, piston 32 is moved upwardly until it engages the member 41. In this position, the port 45 partly registers with port 46, while the port 43 has not yet been brought into registration with the port 44, so that fluid is supplied from valve chamber 34 and the main reservoir 4 to the chamber 11 and thence through passages 12 and 13 to the brake pipe 14. The port 45 being only partly in registration with port 46, the flow of fluid is gradual and thus an overcharge of the brake pipe is prevented.

The amount of downward movement of the diaphragm 7 will be substantially proportional to the differential between the fluid pressures in chamber 8 and in chamber 11, and if the volume of the brake pipe is such that the rate of supply of fluid through the partly registered ports 45 and 46, together with the supply through the feed valve device 29, is not sufficient to arrest the downward movement of the diaphragm, said diaphragm will continue to move downwardly and move the pilot valve 21 farther away from its seat, so that fluid will be vented more rapidly from chamber 33, with the result that the fluid pressure in valve chamber 34 will shift the piston 32 upwardly, compressing the springs 39 and 40.

In this outer position of the piston 32, both ports 43 and 45 register with the respective ports 44 and 46 so as to provide a large port opening for quickly charging the brake pipe.

As the pressure of the fluid supplied to chamber 11 approaches equalization with the pressure of the fluid in chamber 8, the diaphragm 7 is gradually moved upwardly, so that the pilot valve 21 is moved so as to gradually restrict the flow of fluid supplied to chamber 33. As the flow of fluid past the valve 21 is reduced, the increasing pressure of the fluid in chamber 33, as supplied from the valve chamber 34 through passage 36 and the choke 37, together with the pressure exerted by the springs 39 and 40, causes the piston 32, and consequently the slide valve 38, to be shifted downwardly, with the result that the flow area of the supply ports 43 and 45 is gradually restricted and finally said ports are entirely closed. The parts of the brake valve device and of the maintaining valve device then assume the positions shown in Fig. 1.

With the application control valve device 48 in the normal, or slack gathering, position, as shown in Fig. 1, the reduction limiting reservoir 54 is connected to the atmosphere through the pipe and passage 53, cavity 58 and the atmospheric passage 59.

If it is desired to control the brakes on a long train, then in order to effect a service application of the brakes in such a manner as to cause the slack in the train to be gathered without producing excessive shock, the handle 6 of the automatic brake valve device 1 is turned from running position to the usual service position, and with the application control valve device 48 in the slack gathering position, communications are established through the rotary valves 5 and 51, as indicated in Fig. 2.

In this position of the brake valve device, passage 56 leading to the diaphragm chamber 8 and the equalizing reservoir is connected through a cavity 60 in the rotary valve 5 to a passage 61 which is connected through cavity 58 in the rotary valve 51 to passage 53 leading to the reduction limiting reservoir, so that the pressure of fluid in the diaphragm chamber 8 and in the equalizing reservoir is permitted to reduce into the reduction limiting reservoir to equalization, said reduction being restricted by a choke 62 in the cavity 60 to a rate which may equal the usual service rate.

When the pressure in chamber 8 at one side of the diaphragm 7 is thus reduced to slightly below the opposing brake pipe pressure acting in chamber 11 at the opposite side of said diaphragm, said diaphragm is moved upwardly. With the pin 20 carried by the pilot valve 21 acting as a fulcrum, this upward movement of the diaphragm causes the lever 18 to be rotated in a counterclockwise direction, causing the discharge valve 24 to be unseated. With the discharge valve thus unseated, fluid under pressure is vented from chamber 11, and consequently from the brake pipe 14, to the atmosphere through the restricted atmospheric passage 27. Thus brake pipe pressure is reduced to effect an application of the brakes.

The brake pipe pressure thus reduces past the discharge valve 24 to the atmosphere in the usual manner until it becomes slightly lower than the reduced pressure acting in the equalizing reservoir 10 and diaphragm chamber 11, at which time the diaphragm 7 is moved downwardly, which causes the lever 18 to be rotated in a clockwise direction about the pin 20. This movement of the lever 18 causes the discharge valve 24 to be moved toward the seat rib 28. The discharge valve does not fully seat, however, since the cavity 58 in the rotary valve 51 in the control valve device 48 is connected to the atmospheric passage 59, and said cavity is provided with a choke 63, so that after the substantial equalization of pressures in the equalizing reservoir 10 and the reduction limiting reservoir 54, equalizing reservoir pressure continues to reduce at a slow rate, as determined by the flow capacity of the chokes 62 and 63 in series. The discharge valve 24 will operate to throttle the discharge of fluid under pressure from the brake pipe 14 to a corresponding slow rate.

The volume of the reduction limiting reservoir 54 is such as to effect a light reduction in pressure in the equalizing reservoir 10, such for example as seven pounds, and the corresponding degree of reduction in brake pipe pressure effected by the operation of the discharge valve 24 is adapted to apply the brakes on the train with such force as to cause the slack to run in gently.

If, due to brake pipe leakage, the pressure of the fluid in chamber 11 reduces at a faster rate than the rate at which the pressure of the fluid in diaphragm chamber 8 is being reduced by the flow of fluid from said chamber as controlled by the chokes 62 and 63 in series, fluid at the higher pressure in chamber 8 will cause the diaphragm 7 to flex downwardly. As the diaphragm is thus flexed, the lever 18 is rotated in a clockwise direction about the pin 20, causing the discharge valve 24 to be seated on the seat rib 28. With the discharge valve 24 seated, further downward movement of the diaphragm 7 causes the lever 18 to be rotated in a counter-clockwise direction about the pin 23 so as to unseat the pilot valve 21. The unseating of the pilot valve 21 opens communication from chamber 22 to chamber 11, thereby permitting fluid under pressure to be vented from chamber 33 in the maintaining valve device 31, and this venting will be at a rate faster than fluid under pressure can be supplied to said chamber from the valve chamber 34 through passage 36 and the choke 37. The fluid pressure in chamber 34 then causes the piston 32 to be shifted upwardly against the spring 39 until it engages the member 41. This movement of the piston 32 causes the slide valve 38 to be moved to a position in which the port 45 partly registers with port 46, permitting a gradual flow of fluid at main reservoir pressure from chamber 36 to chamber 11 through said partly registered ports and passage 47 and from thence to the brake pipe through passages 12 and 13.

If leakage of fluid from the brake pipe exceeds the capacity of the partly registered ports 45 and 46 to replace such leakage, then the diaphragm 7 will be flexed downwardly still farther, with the result that the pilot valve 21 will be moved farther away from its seat, so that fluid will be vented at a more rapid rate from the piston chamber 33 in the maintaining valve device 31. This rapid venting of fluid from chamber 33 will permit the fluid pressure in valve chamber 34 to shift the piston 32 upwardly, compressing the springs 39 and 40, and moving the slide valve 38 to a position in which both ports 43 and 45 register, respectively, with ports 44 and 46. This permits a more rapid rate of supply of fluid under pressure to the chamber 11, and thence to the brake pipe 14. The degree of unseating of the pilot valve 21 and the consequent amount of movement of the piston 32 and slide valve 38 for controlling the amount of fluid supplied to the brake pipe is such as to maintain brake pipe pressure acting on the lower side of the diaphragm 7 substantially equal to the equalizing reservoir pressure acting on the upper side of said diaphragm, while equalizing reservoir pressure is being reduced to the atmosphere. By thus supplying fluid under pressure to the brake pipe, the brake pipe pressure will not be permitted to reduce at a faster rate than that at which the equalizing reservoir pressure is being reduced.

After the slack in the train has been gathered, the handle 52 of the control valve device 48 is moved from the slack gathering and maintaining position, shown in Fig. 2, to the service position, as shown in Fig. 4, the handle 6 of the brake valve device 1 being left in service position, as shown in Fig. 2. With said devices in the positions mentioned, a further reduction in pressure in the equalizing reservoir 10 and diaphragm chamber 8 is effected through passage 56, cavity 60 in the rotary valve and containing the choke 62, passage 61, cavity 64 in the rotary valve 51 and the atmospheric passage 59. The cavity 64 in the rotary valve 51 does not have a choke or restricted portion interposed therein and fluid under pressure may flow through this passage to the atmospheric passage 59 substantially as rapidly as fluid under pressure is supplied thereto through the choke 62 in the rotary valve 5. As hereinbefore explained, the capacity of the choke 62 may be such that the rate of flow therethrough may equal the usual service rate. The diaphragm 7 is then again moved upwardly to operate the discharge valve 24 to effect a further venting of fluid under pressure from the brake pipe in the usual manner. This further reduction in brake pipe pressure is for applying the brakes with such force as to retard or stop the train, as desired.

It will be noted that in service position of the control valve device 48, as shown in Fig. 4, passage 35, leading to the valve chamber 34 in the maintaining valve device 31 is lapped by the rotary valve 51, so that in this position said maintaining valve device is inoperative.

When the desired degree of reduction is effected in the pressure in the equalizing reservoir 10, the brake valve handle 6 may be turned from service position to lap position, as shown in Fig. 3, and in lap position, the passage 56 from the equalizing reservoir 9 and from the diaphragm chamber 8 is lapped to prevent further reduction of pressure therein. With the rotary valve 51 of the control valve device 48 left in service position, as shown in Fig. 4, in which it was placed in effecting the second stage of the reduction in brake pipe pressure, the passage 35 leading to the valve chamber 34 in the maintaining valve device 31 is lapped, so that said device is rendered inoperative.

If, with the brake valve device 1 in lap position, as shown in Fig. 3, it is desired to render the maintaining valve device 31 operative, the rotary valve 51 of the control valve device 48 is moved to the slack gathering and maintaining service position, also shown in Fig. 3. In this position of the rotary valve 51, the port 57 registers with the passage 35 so that fluid under pressure is supplied from the rotary valve chamber 49 through said port and passage to the valve chamber 34 in the maintaining valve device 31. With fluid under pressure thus supplied to the valve chamber 34, the maintaining valve device 31 is rendered operative to maintain brake pipe pressure against leakage, in the manner hereinbefore described.

It will be evident from the foregoing that in order to prevent a harsh gathering of slack in a train when effecting a service application of the brakes, the brake pipe pressure is reduced in substantially two stages, there being the initial light degree of reduction in brake pipe pressure for gently gathering the slack in the train, after which there is a second stage of reduction for effectively stopping or retarding the train.

In order to charge the brake pipe 14 and thereby effect a release of the brakes, the brake valve handle 6 may be moved to running position, as shown in Fig. 1, and the control valve handle 52 is moved to the normal, or slack gathering and maintaining service position, also shown in Fig. 1, if it has not already been moved to that position for rendering the maintaining valve device 31 operative when the brake valve device is in lap position, as above described.

In the running position of the rotary valve 5 of the brake valve device 1, the feed valve device 29 operates to supply fluid under pressure to the brake pipe 14, the diaphragm chamber 8 and the equalizing reservoir 10, and the discharge valve chamber 11, in the same manner as in initially charging the train, and if sufficient differential is developed across the diaphragm 7 to cause said diaphragm to unseat the pilot valve 21, then the maintaining valve device will operate, as described in connection with the initial charging of the train, to supply fluid under pressure to the brake pipe.

In the normal or slack gathering and maintaining service position of the control valve device 48, as shown in Fig. 1, the reduction limiting reservoir 54 is vented to the atmosphere through pipe and passage 53, cavity 58 in the rotary valve 51 and the atmospheric passage 59.

Figs. 1, 2 and 3 illustrate one form of my invention in which a lever is operatively connected to a movable abutment which is subject to the opposing pressures of the equalizing reservoir and the brake pipe, and to the maintaining valve pilot valve and the brake pipe discharge valve, which form has been described hereinbefore.

Figs. 5, 6 and 7 illustrate another form of the invention in which the lever arrangement interposed between the movable abutment and the pilot valve and discharge valve is provided with ball and socket fulcrum connections, so that in addition to the mechanical advantages of the lever, freedom of action of said lever is allowed, thereby providing a device which is sensitive to slight variations in the controlling pressures of the equalizing reservoir and the brake pipe.

As shown in Fig. 5, the control piston 65 is provided with a stem 66, the end of which is slidably mounted in a bore 67 in the brake valve casing, for guiding the movement of said piston, this piston being adapted to actuate a lever 109 for controlling the operation of a maintaining valve pilot valve 68 and a brake pipe discharge valve 69, which valves may function in the same manner as the corresponding valves shown in Figs. 1, 2 and 3.

The lever 109 is made cruciform, having arms 70 and 71 disposed preferably at right angles to each other. One end of the arm 70 is fulcrumed to the stem 66 through the medium of a pin 72, one end of which is slidably received in a longitudinal bore 73 in said end of the arm 70 and the other end of which is pressed into a radial bore provided in a ball 74 and is then secured to said ball by means of a pin 75. The ball 74 is received within a socket portion 78 provided on the stem 66, said socket portion being provided with an internal concave bearing surface 76 having a curvature substantially corresponding with the curvature of the ball 74. The ball 74 is maintained in place by a cap 77 having screw-threaded connection with the socket portion 78 and having an internal concave bearing surface substantially corresponding in curvature with that of the ball 74 and having an opening 79 through which the pin 72 extends. The cap 77 may be provided with an annular flange 115, so that when the cap is screwed into the socket portion 78, with said flange in tight engagement with said socket portion, the ball 74 is free to rotate but without any appreciable lost motion.

The other end of the arm 70 is fulcrumed, by means of a ball and socket connection, to a stud 79 which may be screwed into the interior wall of the brake valve casing. This ball and socket connection is similar to that provided, and above described, for connecting the other end of the arm 70 to the piston stem 66, with the exception that the stem 80 which carries the ball 81 is fixed to the arm 70 by means of a pin 82 instead of being slidably carried by said arm, as is the pin 72.

The arm 71 is pivotally connected at one end to the stem 83 of the pilot valve 68 and at the other end to the stem 84 of the discharge valve 69 through a ball and socket connection similar to the connections above described. It will be noted that the seating surface of said valves is arcuate in form so that said valves will seat properly regardless of the angularity of the respective stems.

It will be obvious that the absence of lost motion in the fulcrum and pivot connections, the mechanical advantage due to the arrangement of the lever arms and the freedom of action provided at the fulcrum and pivot connections combine to produce a valve device which is sensitive to a slight differential in pressure acting upon the controlling piston 65.

According to the construction shown in Figs. 8 and 9, the brake valve casing is provided with a piston chamber 86 and a chamber 87 separated by a partition wall 88 having a passageway 89 therethrough connecting said chambers and also having a bore 90. Contained within the chamber 86 is the controlling piston 85 having a stem 91, the upper end of which is slidably guided within said bore and the lower end of which is slidably guided within a bore 92 provided in the brake valve casing. The piston stem 91 is provided, intermediate its ends, with two spaced annular flanges or collars 93 and 94 having the faces 95 and 96, respectively, facing each other.

Pivotally mounted, by means of a pin 95 on a lug 96 carried by the brake valve casing and extending into chamber 87 are the spaced levers 97 and 98. The outer ends of said levers are connected together by means of a pin 110 and rotatably mounted on said pin and disposed between said levers is a roller 99. The roller is disposed between the faces 95 and 96 of the flanges 93 and 94, respectively, and is adapted to roll on said faces, one at a time, depending upon the direction of movement of the piston 85. The diameter of the roller 99 is slightly less than the distance between the faces 95 and 96 so as to permit the roller to roll freely upon either of said faces.

Pivotally carried by the levers 97 and 98, through the medium of a pin 100, are the spaced levers 101 and 102 which are disposed in the space separating the levers 97 and 98. At one side of the pivot pin 100, the levers 101 and 102 are connected together by a pin 103 on which the stem 104 of the discharge valve 105 is pivotally mounted. At the other side of the pivot pin 100, the end of the levers 101 and 102 are connected together by means of a pin 106 on which the stem 107 of the supply valve 108 is pivotally mounted.

Assuming that the piston 85 is in the normal position as shown in Fig. 8, with the supply valve 108 and the discharge valve 105 seated, it will be seen that when the differential in fluid pressures acting on the piston 85 causes said piston to move upwardly, the face 96 of the flange 94 will engage the roller 99 and cause said roller to move upwardly. The consequent rotation of the levers 97 and 98 in a clockwise direction about the pin 95 raises the pin 100. With the pin 106 as a fulcrum, due to the valve 108 being seated, the upward movement of the pin 100 causes the outer end of the levers 101 and 102 to be raised, thereby lifting the discharge valve 105 from its seat.

Similarly, when the piston 85 is moved downwardly from its normal position, the levers 97 and 98 are caused to rotate in a counter-clockwise direction through the engagement of the roller 99 with the face 95 of the flange 93, carrying the pin 100 in a downward direction. The discharge valve 105 being seated, the pin 103 acts as a fulcrum, and the downward movement of the pin 100 causes the inner end of the levers 101 and 102 to move downwardly, unseating the supply valve 108.

According to the construction shown in Fig. 8, the valve 108 is a supply valve and it directly controls the supply of fluid under pressure from passage 35 to chamber 87 and thence to the brake pipe 14 through passage 89, chamber 86, and passages 12 and 13 for maintaining brake pipe pressure against leakage, when the brake valve device is conditioned to effect a slack gathering reduction in brake pipe pressure, instead of controlling the operation of a maintaining valve device, as does the pilot valve 21 in the construction shown in Figs. 1, 2 and 3, and the pilot valve 68 shown in Fig. 7. Obviously, the supply valve 108 must be of greater capacity than said pilot valves and therefore requires a greater force to unseat it. With a lever arrangement such as is shown in Figs. 8 and 9, this greater force may be supplied without requiring a greater differential to operate the controlling piston than is required to unseat the pilot valves 21 and 68.

From the foregoing description of my invention, it will be evident that the automatic brake valve device may be conditioned to effect the gentle run-in of slack on a long train, brake pipe pressure being maintained against leakage while the brake valve device is so conditioned. It will further be evident that I have provided a valve device which is responsive to a slight differential in fluid pressure acting on a controlling piston for controlling the operation of a brake pipe discharge valve and a valve for controlling the supply of fluid under pressure to the brake pipe for maintaining brake pipe pressure against leakage when the brake valve device is conditioned to effect a slack gathering reduction in brake pipe pressure.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a brake pipe, of an equalizing reservoir, a brake valve device, means operative upon movement of said brake valve device to a position for effecting a service application of the brakes to vent fluid under pressure from said equalizing reservoir, and a manually operable valve device controlling the passage through which fluid is vented from the equalizing reservoir when the brake valve device is in the service application position, said manually operable valve device having one position for establishing communication through which fluid vented from the equalizing reservoir is vented at a restricted rate and another position in which fluid vented from the equalizing reservoir is vented at a more rapid rate.

2. In a fluid pressure brake, the combination with a brake pipe, of an equalizing reservoir, a brake valve device, means operative upon movement of said brake valve device to a position for effecting a service application of the brakes to vent fluid under pressure from said equalizing reservoir, and a manually operable valve device controlling the passage through which fluid is vented from the equalizing reservoir when the brake valve device is in the service application position, said manually operable valve device having one position for establishing communication through which fluid vented from the equalizing reservoir is vented through a restricted exhaust port to the atmosphere and another position in which fluid vented from the equalizing reservoir is vented through a larger atmospheric outlet.

3. In a fluid pressure brake, the combination with a brake pipe, of an equalizing reservoir, a reduction chamber, a brake valve device, means operative upon movement of said brake valve device to a position for effecting a service application of the brakes to vent fluid under pressure from said equalizing reservoir, and a manually operable valve device controlling the passage through which fluid is vented from the equalizing reservoir when the brake valve device is in the service application position, said manually operable valve device having one position for establishing communication through which fluid vented from said equalizing reservoir is admitted to said chamber and another position in which the fluid vented from said equalizing reservoir is vented to the atmosphere.

4. In a fluid pressure brake, the combination with a brake pipe, of an equalizing reservoir, a reduction chamber, a brake valve device, means operative upon movement of said brake valve device to a position for effecting a service application of the brakes to vent fluid under pressure from said equalizing reservoir, and a manually operable valve device controlling the passage through which fluid is vented from the equalizing reservoir when the brake valve device is in the service application position, said manually operable valve device having one position for establishing communication through which fluid vented from said equalizing reservoir is vented to said chamber at a certain rate and to the atmosphere at a more restricted rate and having another position in which the fluid vented from said equalizing reservoir is vented to the atmosphere at a more rapid rate than said restricted rate.

5. In a fluid pressure brake, the combination with a brake pipe, of an equalizing reservoir, a reduction chamber, a brake valve device having a position for venting fluid under pressure from said equalizing reservoir, a valve mechanism controlled by the reduction in pressure in said equalizing reservoir for effecting a corresponding reduction in brake pipe pressure, and a manually operable valve device controlling the passage through which fluid is vented from the equalizing reservoir when the brake valve device is in the service application position, said manually operable valve device having one position for establishing communication through which fluid vented from said equalizing reservoir is vented to said reduction chamber to effect a limited reduction in brake pipe pressure at a certain rate and for also establishing communication through which fluid vented from said equalizing reservoir reduces to the atmosphere at a more restricted rate upon the substantial equalization of pressures in said equalizing reservoir and reduction chamber and having another position for establishing communication through which the fluid vented from said equalizing reservoir is vented to the atmosphere at a more rapid rate than said restricted rate.

6. In a fluid pressure brake, the combination with a brake pipe, of an equalizing reservoir, a brake valve device having a brake applying position for venting fluid under pressure from said equalizing reservoir, of a movable abutment subject to the opposing pressures of said brake pipe and equalizing reservoir, a brake pipe discharge valve movable by said abutment upon a reduction in pressure in said equalizing reservoir below the pressure in said brake pipe for venting fluid under pressure from said brake pipe, a maintaining valve device operative to supply fluid under pressure to said brake pipe, a pilot valve movable by said abutment upon a reduction in pressure in said brake pipe below the pressure in said equalizing reservoir for effecting operation of said maintaining valve device, and a manually operable valve device movable to one position for rendering said maintaining valve device effective and movable to another position for rendering said maintaining valve device ineffective.

7. In a fluid pressure brake, the combination with a brake pipe, of an equalizing reservoir, a brake valve device having a brake applying position for venting fluid under pressure from said equalizing reservoir, of a movable abutment subject to the opposing pressures of said brake pipe and equalizing reservoir, a brake pipe discharge valve movable by said abutment upon a reduction in pressure in said equalizing reservoir below the pressure in said brake pipe for venting fluid under pressure from said brake pipe, a valve movable by said abutment upon a reduction in pressure in said brake pipe below the pressure in said equalizing reservoir for controlling the supply of fluid under pressure to said brake pipe, and a manually operable valve device having one position for rendering the second mentioned valve effective and having another position for rendering the second mentioned valve ineffective.

8. In a fluid pressure brake, a brake controlling valve device comprising a casing, valves mounted in said casing for controlling the supply of fluid under pressure to and the release of fluid under pressure from a chamber, a movable abutment subject to the opposing pressures of said chamber and another chamber for operating said valves, and a lever for operatively connecting said abutment with said valves and having one arm connected at one end by a ball and socket connection to said abutment and at the other end by a ball and socket connection to said casing, and another arm extending generally perpendicularly to the first arm and connected by ball and socket connections to said valves.

9. In a fluid pressure brake, a brake controlling valve device comprising a casing, valves mounted in said casing for controlling the supply of fluid under pressure to and the release of fluid under pressure from a chamber, a movable abutment subject to the opposing pressures of said chamber and another chamber for operating said valves, and a lever for operatively connecting said abutment with said valves and having one arm connected at one end by a ball and socket connection to said abutment and at the other end by a ball and socket connection to said casing, said arm having telescopic connection with one of said ball and socket connections, and another arm extending generally perpendicularly to the first arm and connected by ball and socket connections to said valves.

10. In a fluid pressure brake, a brake controlling valve device comprising a casing, valves mounted in said casing for controlling the supply of fluid under pressure to and the release of fluid under pressure from a chamber, a movable abutment subject to the opposing pressures of said chamber and another chamber for operating said valves, a lever for operatively connecting said abutment with said valves and having one arm connected at one end by a ball and socket connection to said abutment and at the other end by a ball and socket connection to said casing, and another arm extending generally perpendicularly to the first arm and connected by ball and socket connections to said valves, and means for compensating for the variation in distance between the fulcrum connection on the abutment and the fulcrum connection on the casing upon movement of said abutment relative to said fulcrum connection on the casing.

11. In combination, a casing having a valve seat, a valve having a surface engaging said seat and having a stem rigidly associated therewith, a lever movable about a fulcrum and operatively connected to said valve through said stem for unseating said valve, said surface being spherical in shape so as to maintain leakproof engagement with said seat during change in angularity of said lever.

12. In a fluid pressure brake, in combination, a brake pipe, an equalizing reservoir, means responsive to the pressure of the fluid in the equalizing reservoir and controlling the release of fluid from the brake pipe, the reservoir having a passage associated therewith and communicating with the atmosphere, and a plurality of valve devices controlling communication through said passage, one of said valve devices having one position for establishing communication through said passage and another position for cutting off communication through said passage, another of said valve devices having one position for establishing communication through which fluid is vented from the equalizing reservoir at a restricted rate, and another position for establishing communication through which fluid is vented from the equalizing reservoir at a more rapid rate.

13. In a fluid pressure brake, in combination, a brake pipe, an equalizing reservoir, means responsive to the pressure of the fluid in the equalizing reservoir and controlling the release of fluid from the brake pipe, the reservoir having a passage associated therewith and communicating with the atmosphere, and a plurality of valve devices controlling communication through said passage, one of said valve devices having one position for establishing communication through said passage, and another position for cutting off communication through said passage, another of said valve devices having one position for establishing communication through which fluid is vented from the equalizing reservoir at a restricted rate, and another position for establishing communication through which fluid is vented from the equalizing reservoir at a more rapid rate, either of said valve devices being movable between said positions independently of the other of said valve devices.

14. In a fluid pressure brake, in combination, a brake pipe, an equalizing reservoir, means responsive to the pressure of the fluid in the equalizing reservoir and controlling the release of fluid from the brake pipe, a reduction chamber, the equalizing reservoir having a passage associated therewith and communicating with the atmosphere, and a plurality of valve devices controlling communication through said passage, one of said valve devices having one position for establishing communication through said passage, and another position for cutting off communication through said passage, another of said valve devices having one position for establishing communication through which fluid is vented from the equalizing reservoir, and another position for establishing communication between said passage and the reduction chamber.

15. In a fluid pressure brake, in combination, a brake pipe, an equalizing reservoir, means responsive to the pressure of the fluid in the equalizing reservoir and controlling the release of fluid from the brake pipe, a reduction chamber, the equalizing reservoir having a passage associated therewith and communicating with the atmosphere, and a plurality of valve devices controlling communication through said passage, one of said valve devices having one position for establishing communication through said passage, and another position for cutting off communication through said passage, another of said valve devices having one position for establishing communication through which fluid is vented from the equalizing reservoir at one rate, and another position for establishing communication between said passage and the reduction chamber and for establishing communication through which fluid is vented from the equalizing reservoir at a reduced rate.

16. In a fluid pressure brake, in combination, a brake pipe, an equalizing reservoir, means responsive to the pressure of the fluid in the equalizing reservoir and controlling the release of fluid from the brake pipe, a reduction chamber, the equalizing reservoir having a passage associated therewith and communicating with the atmosphere, and a plurality of valve devices controlling communication through said passage, one of said valve devices having one position for establishing communication through said passage, and another position for cutting off communication through said passage, another of said valve devices having one position for establishing communication through which fluid is vented from the equalizing reservoir at one rate and in which communication is established between said passage and the reduction chamber, and another position for establishing communication through which fluid is vented from the equalizing reservoir at a more rapid rate and in which communication between said passage and the reduction chamber is cut off.

17. In a fluid pressure brake, in combination, a brake pipe, a maintaining valve device for supplying fluid under pressure to said brake pipe, an equalizing reservoir having a vent passage associated therewith and communicating with the atmosphere, means responsive to the pressure of the fluid in the equalizing reservoir and controlling the release of fluid from the brake pipe, and a plurality of valve devices controlling communication through said vent passage, one of said valve devices having one position for establishing communication through said passage, and another position for cutting off communication through said passage, another of said valve devices having one position for establishing communication through which fluid is vented from the equalizing reservoir at one rate and another position for establishing communication through which fluid is vented from the equalizing reservoir at a greater rate, and in which the maintaining valve device is rendered ineffective to supply fluid to the brake pipe.

18. In a fluid pressure brake, in combination, a brake pipe, a reduction chamber, a maintaining valve device for supplying fluid under pressure to the brake pipe, an equalizing reservoir having a vent passage associated therewith and communicating with the atmosphere, means responsive to the pressure of the fluid in the equalizing reservoir and controlling the release of fluid from the brake pipe, and a plurality of valve devices controlling communication through said vent passage, one of said valve devices having one position for establishing communication through said passage and another position for cutting off communication through said passage, another of said valve devices having one position for establishing communication through which fluid is vented from the equalizing reservoir at one rate and in which communication is established between said passage and the reduction chamber, and another position for establishing communication through which fluid is vented from the equalizing reservoir at a greater rate, and in which the maintaining valve device is rendered ineffective to supply fluid to the brake pipe.

19. In a fluid pressure brake, a brake controlling valve device comprising a casing, a pair of valves mounted in said casing for controlling the supply of fluid under pressure to and the release of fluid under pressure from a chamber, and means for actuating said valves, said means comprising a member reciprocally movable between spaced points, and an operating member comprising a portion positioned intermediate the valves and having one end connected to said casing and having the other end connected to said movable member, the operating member having portions extending therefrom in a plane generally perpendicular to the plane of the first named portion, the last named portions being operatively connected to said valves.

20. In combination, a casing having a valve seat, a valve comprising a member having a surface adapted to engage said seat and having a stem rigidly secured thereto, a lever movable about a fulcrum and operatively connected to said stem for actuating said valve, the valve seat engaging surface being substantially spherical in shape so as to maintain leakproof engagement with said seat during change in the angularity of the lever.

21. In a fluid pressure brake equipment, in combination, a casing having a chamber therein, movable abutment means subject on one side to the pressure of the fluid in said chamber, said abutment means having spaced operating surfaces associated therewith, a valve controlling the supply of fluid to said chamber, a valve controlling the release of fluid from said chamber, a lever pivotally secured to said valves, an arm pivotally secured to a wall of the said chamber and to said lever at a point intermediate the points of connection of the lever with the said valves, and means pivotally secured to the arm and extending between the operating surfaces associated with the abutment means and movable relative thereto in a plane extending generally perpendicular to the plane of movement of the abutment means.

22. In a fluid pressure brake equipment, in combination, a casing having a chamber therein, movable abutment means subject on one side to the pressure of the fluid in said chamber, said abutment means having spaced operating surfaces associated therewith, a valve controlling the supply of fluid to said chamber, a valve controlling the release of fluid from said chamber, a lever pivotally secured to said valve, an arm secured to the wall of the said chamber so as to be pivotal about an axis substantially fixed relative to said chamber wall, said arm being pivotally secured to said lever at a point intermediate the points of connection of the lever with the said valves, and means pivotally secured to said arm and extending between the operating surfaces associated with said abutment means and movable relative thereto in a plane extending generally perpendicular to the plane of movement of the abutment means.

23. In a fluid pressure brake equipment, in combination, a casing having a chamber therein, movable abutment means subject on one side to the pressure of the fluid in said chamber, said abutment means having spaced operating surfaces associated therewith, a valve controlling the supply of fluid to said chamber, a valve controlling the release of fluid from said chamber, a lever pivotally secured to said valve, an arm pivotally secured to a wall of the said chamber and to said lever at a point intermediate the points of connection of the lever with the said valves, means pivotally secured to the arm and extending between the operating surfaces associated with the abutment means and movable relative thereto in a plane extending generally perpendicular to the plane of movement of the abutment means, and biasing means associated with said lever and yieldingly urging said lever in the direction to move said valves to the closed position.

24. In a fluid pressure brake, in combination, a brake pipe, an equalizing reservoir, a supply reservoir, valve means subject to the opposing pressures of the fluid in the supply reservoir and in a chamber for supplying fluid under pressure from said supply reservoir to said brake pipe, means for supplying fluid under pressure from said supply reservoir to said chamber at one rate, and a valve device subject to the opposing pressure of the fluid in the equalizing reservoir and in the brake pipe and controlling a passage through which fluid may be supplied from said chamber to the brake pipe at a rate more rapid than the said one rate.

25. In a fluid pressure brake, in combination, a brake pipe, an equalizing reservoir, a supply reservoir, valve means subject to the opposing pressures of the fluid in the supply reservoir and in a chamber for supplying fluid under pressure from said supply reservoir to said brake pipe, means for supplying fluid under pressure from said supply reservoir to said chamber at one rate, a movable abutment subject to the opposing pressures of the fluid in the equalizing reservoir and in the brake pipe, a valve controlled by said abutment and controlling the release of fluid from the brake pipe, and a valve controlled by said abutment and controlling a passage through which fluid may be released from said chamber at a rate more rapid than said one rate.

26. In a fluid pressure brake, in combination, a brake pipe, an equalizing reservoir, a supply reservoir, valve means subject to the opposing pressures of the fluid in the supply reservoir and in a chamber for supplying fluid under pressure from said supply reservoir to said brake pipe, means for supplying fluid under pressure from said supply reservoir to said chamber at one rate, and a valve device subject to the opposing pressures of the fluid in the equalizing reservoir and in the brake pipe and controlling a passage through which fluid may be released from said chamber at a rate more rapid than the said one rate.

ELLIS E. HEWITT.